United States Patent [19]
Phillips et al.

[11] Patent Number: 5,544,670
[45] Date of Patent: Aug. 13, 1996

[54] INFLATION DEVICE FOR AN INFLATABLE ARTICLE OF MANUFACTURE AND ADAPTOR THEREFOR

[75] Inventors: Matthew L. Phillips, North Easton, Mass.; Anthony S. Hollars, Tucson, Ariz.

[73] Assignees: Reebok International Ltd., Stoughton, Mass.; Innovations in Cycling, Tucson, Ariz.

[21] Appl. No.: 167,007

[22] Filed: Dec. 15, 1993

[51] Int. Cl.$^6$ ............................ F16K 15/20; B60C 29/00
[52] U.S. Cl. ............................ 137/224; 251/118; 222/5
[58] Field of Search ................... 137/223, 224, 137/226, 334; 251/118; 222/3, 5; 441/93, 94, 95

[56] References Cited

U.S. PATENT DOCUMENTS

| | | | |
|---|---|---|---|
| 710,674 | 10/1902 | Fassmann | 215/5 |
| 1,071,271 | 8/1913 | Spangler | 251/321 |
| 1,198,476 | 9/1916 | Pearson | 137/224 |
| 1,322,338 | 11/1919 | Pitts | 137/224 |
| 1,444,189 | 2/1923 | Key | 251/238 |
| 1,531,731 | 3/1925 | Burgess | 137/224 |
| 1,802,523 | 4/1931 | Morangier | 141/352 |
| 1,818,178 | 8/1931 | Weisberg | 137/224 |
| 2,015,882 | 10/1935 | Brewer | 137/224 |
| 2,016,113 | 10/1935 | Lambert et al. | 221/73.5 |
| 2,036,695 | 4/1936 | Heigis | 221/73.5 |
| 2,205,938 | 6/1940 | Ward | 221/74 |
| 2,498,596 | 2/1950 | Wallach | 222/3 |
| 2,533,685 | 12/1950 | Nurkiewicz | 169/31 |
| 2,574,028 | 11/1951 | Fields et al. | 222/5 |
| 2,575,908 | 11/1951 | Clifford | 152/415 |
| 2,717,100 | 9/1955 | Engelder | 222/5 |
| 2,860,634 | 11/1958 | Duncan et al. | 128/206 |
| 2,878,683 | 3/1959 | Huthsing, Sr. et al. | 74/101 |
| 3,080,094 | 3/1963 | Modderno | 222/82 |
| 3,548,869 | 12/1970 | Weise et al. | 137/516.29 |
| 3,658,208 | 4/1972 | Hansen | 222/3 |
| 3,776,227 | 12/1973 | Pitesky et al. | 128/203 |
| 3,834,433 | 9/1974 | Thompson | 141/392 |
| 3,996,957 | 12/1976 | Goldish et al. | 137/224 |
| 4,054,163 | 10/1977 | Brown, Jr. et al. | 141/291 |
| 4,088,147 | 5/1978 | Krechel et al. | 137/223 |
| 4,168,015 | 9/1979 | Robinette | 251/118 X |
| 4,370,997 | 2/1983 | Braithwaite et al. | 137/116.3 |
| 4,489,855 | 12/1984 | Boetger | 222/5 |
| 4,658,869 | 4/1987 | Soon-Fu | 141/98 |
| 4,662,412 | 5/1987 | Swallert | 141/284 |
| 4,694,850 | 9/1987 | Fumino | 137/318 |
| 4,773,454 | 9/1988 | Kroh et al. | 141/330 |
| 4,778,595 | 10/1988 | Sable et al. | 210/119 |
| 4,934,543 | 6/1990 | Schmidt | 215/228 |
| 4,969,493 | 11/1990 | Lee | 222/5 X |
| 5,012,954 | 5/1991 | Will | 222/5 |
| 5,020,395 | 6/1991 | Mackey | 222/5 X |
| 5,022,565 | 6/1991 | Sturman et al. | 222/396 |
| 5,234,015 | 8/1993 | Fumino | 222/5 X |

FOREIGN PATENT DOCUMENTS

| | | | |
|---|---|---|---|
| 352167 | 4/1922 | Germany | 437/224 |
| 3205264A1 | 8/1983 | Germany . | |

OTHER PUBLICATIONS

Innovations in Cycling, Inc., Interbike™ Buyer Official Show Guide, 10th Ann. Interbike 1991 Int'l. Bicycle Expo. Mega MicroBlast $CO_2$ Air Dispenser, Date Unknown.

*Primary Examiner*—John Rivell
*Attorney, Agent, or Firm*—Sterne, Kessler, Goldstein & Fox P.L.L.C.

[57] ABSTRACT

The present invention is a pressurized gas inflation device for inflating an inflatable article of manufacture. In the preferred embodiment, the device includes a cylindrical housing which receives a cartridge of pressurized gas, a head unit and a nozzle. The head unit includes a valve assembly for controlling the flow of gas through the device. The nozzle includes a means for controlling the flow rate of the gas flowing through the nozzle and a means for relieving the build-up of excess pressure. The nozzle of the device may be structured to couple in a fluid-tight manner with an adaptor of an inflation valve. The adaptor of the present invention includes a top surface, at least one side wall and several apertures for receiving fluid from an inflation device or for venting fluid from a bladder.

27 Claims, 13 Drawing Sheets

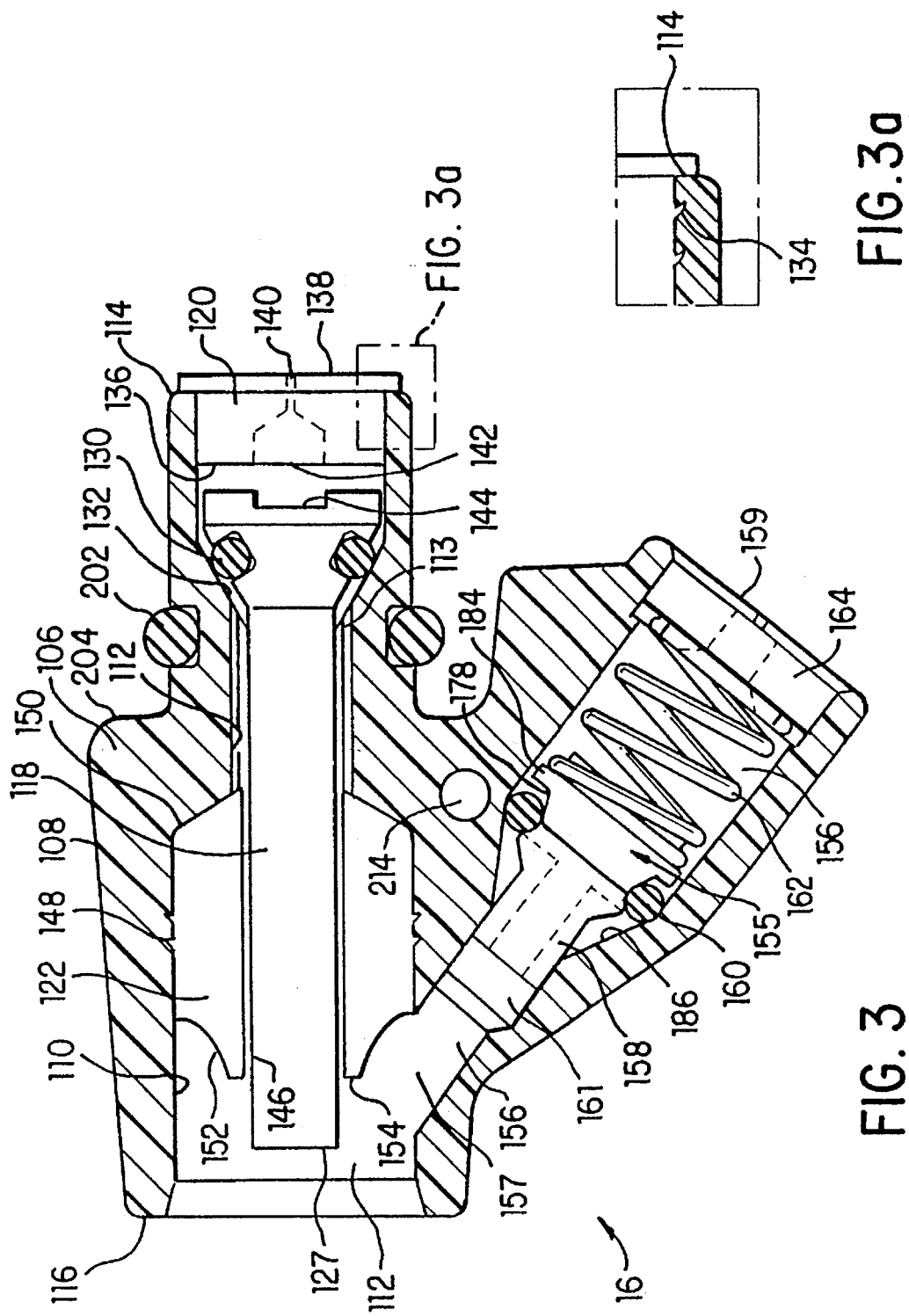

5,544,670

INFLATION DEVICE FOR AN INFLATABLE ARTICLE OF MANUFACTURE AND ADAPTOR THEREFOR

BACKGROUND OF THE INVENTION

1. Field of the Invention

The present invention relates to an inflation mechanism for an inflatable article of manufacture. More particularly, the present invention is an inflation mechanism which contains a source of pressurized gas.

2. Related Art

Numerous inflation devices or pumps are known in the art. For example, bulb-type pumps or syringes have been used for many years to inflate or inject air into various articles of manufacture, including inflatable air mattresses, blood-pressure cuffs and atomizers. U.S. Pat. No. 451,643 to Schoettl discloses such a bulb-type pump for an atomizer. U.S. Pat. No. 5,158,767 to Cohen discloses another bulb-type pump for use specifically with an athletic shoe having an inflatable bladder. The pump of the Cohen patent includes top and bottom layers which are formed from urethane sheets. The pump further includes an inlet in fluid communication with the atmosphere and an outlet in fluid communication with the bladder. The bladder is inflated by depressing the top surface of the pump to force ambient air into the bladder. The pump is conveniently located on the upper of the shoe and is generally lightweight.

Another inflation mechanism for inflating an elastomeric bladder is disclosed in U.S. Pat. No. 5,074,765 to Pekar. The Pekar patent discloses a pump which includes an open-sided dome member. The dome member is fused or heat-sealed about an opening provided in the top layer of the bladder. The dome member includes a flapper-type inlet valve and a duck-bill outlet valve. Fluid is introduced into the bladder by depressing and releasing the top of the dome.

In an effort to obtain rapid inflation of an inflatable bladder, other inflation mechanisms utilizing a source of pressurized gas (specifically $CO_2$ gas) have been developed. U.S. Pat. No. 4,773,545 to Kroh discloses such a device for inflating a tire. The device includes a cartridge of pressurized gas and an inflating head. The outlet of the inflating head is threaded to connect with the valve of a tire, specifically a bicycle tire. Although the Kroh device inflates a bicycle tire rapidly and at high pressures, the valve assembly of the Kroh patent is complex in nature and is therefore rather expensive to manufacture.

Still another inflation device which utilizes a self-contained source of pressurized gas is disclosed in U.S. Pat. No. 5,012,954 to Will. The inflation system of the Will patent is specifically structured for use with bicycle tires incorporating SCHRADER™ or PRESTA™ type valves. Unfortunately, the device of the Will patent is not capable of regulating the flow of gas to avoid over inflation of the bladder. Therefore, the volume of the cartridge to be used with the Will device must match the capacity of the bladder to be inflated.

Accordingly, it is an object of the present invention to provide an improved pressurized inflation device for an inflatable article of manufacture which is simple in construction and inexpensive to manufacture.

Another object of the invention is to provide a pressurized inflation device which utilizes standardized, non-threaded gas cartridges.

Yet another object of the invention is to provide a pressurized inflation device which is compact, lightweight, and convenient for use with all types of inflatable bladders.

Still another object of the invention is to provide a pressurized inflation device which controls the volume of fluid passing to the inflatable bladder and allows long-term containment of unused gas.

Yet another object of the invention is to provide a pressurized inflation device which includes a means for relieving a build-up of excess pressure to avoid damaging an inflatable bladder.

SUMMARY OF THE INVENTION

In accordance with the objectives of the present invention as embodied and described herein, the present invention is an inflation device including a housing, a head unit, a source of pressurized gas and a nozzle. In one aspect of the invention the nozzle includes a first end which is in fluid communication with the head unit and a second end which engages with an inflation valve of an inflatable article of manufacture. A conduit extends between the first end and the second end of the nozzle. Positioned within this conduit is a means for restricting the flow of gas flowing through the nozzle. A pressure relieving means is also provided within the nozzle of the device to relieve any build-up of excess pressure. The pressure relieving means includes a poppet, a means for biasing the poppet in a closed position, and a plug. The plug defines a hole through which gas may escape to relieve the build-up of excess pressure.

The nozzle may be molded from a plastic containing glass-filled nylon filaments. The pressurized gas may be essentially $CO_2$ gas. In this embodiment of the invention, the nozzle of the device further includes a heat sink for revaporizing any solid $CO_2$ which may be formed as the phase of the gas changes. The heat sink of the invention may take the form of a brass plug.

In still another aspect, the head unit includes a valve assembly which is normally biased in a closed position but moveable into an open position by a plunger disposed in contact with the valve assembly. The valve assembly of the invention enables long-term containment of any unused gas within the device.

In yet another aspect of the invention, the nozzle may be provided with a safety pin which opens an inflation valve of an inflatable article of manufacture.

In still another aspect of the invention, the outlet of the nozzle is configured to be coupled to an adaptor of an inflation valve. The adaptor of the inflation valve may include a top surface, at least one side wall, and at least one aperture. An attachment tab may be provided on the exterior of the adaptor to enable attachment of the adaptor to an inflatable bladder. A projection which assists in opening the inflation valve may also be provided on the interior surface of the adaptor's top surface.

BRIEF DESCRIPTION OF THE FIGURES

Various objects, features and attendant advantages of the present invention will be more fully understood from the following detailed description of the present invention when considered in connection with the accompanying drawings, in which:

FIG. 3 is a cross-sectional view of the nozzle of the inflation device;

FIG. 3a is a partial, enlarged, cross-sectional view of the inlet of the nozzle;

DETAILED DESCRIPTION OF THE PREFERRED EMBODIMENT

Figure 1:
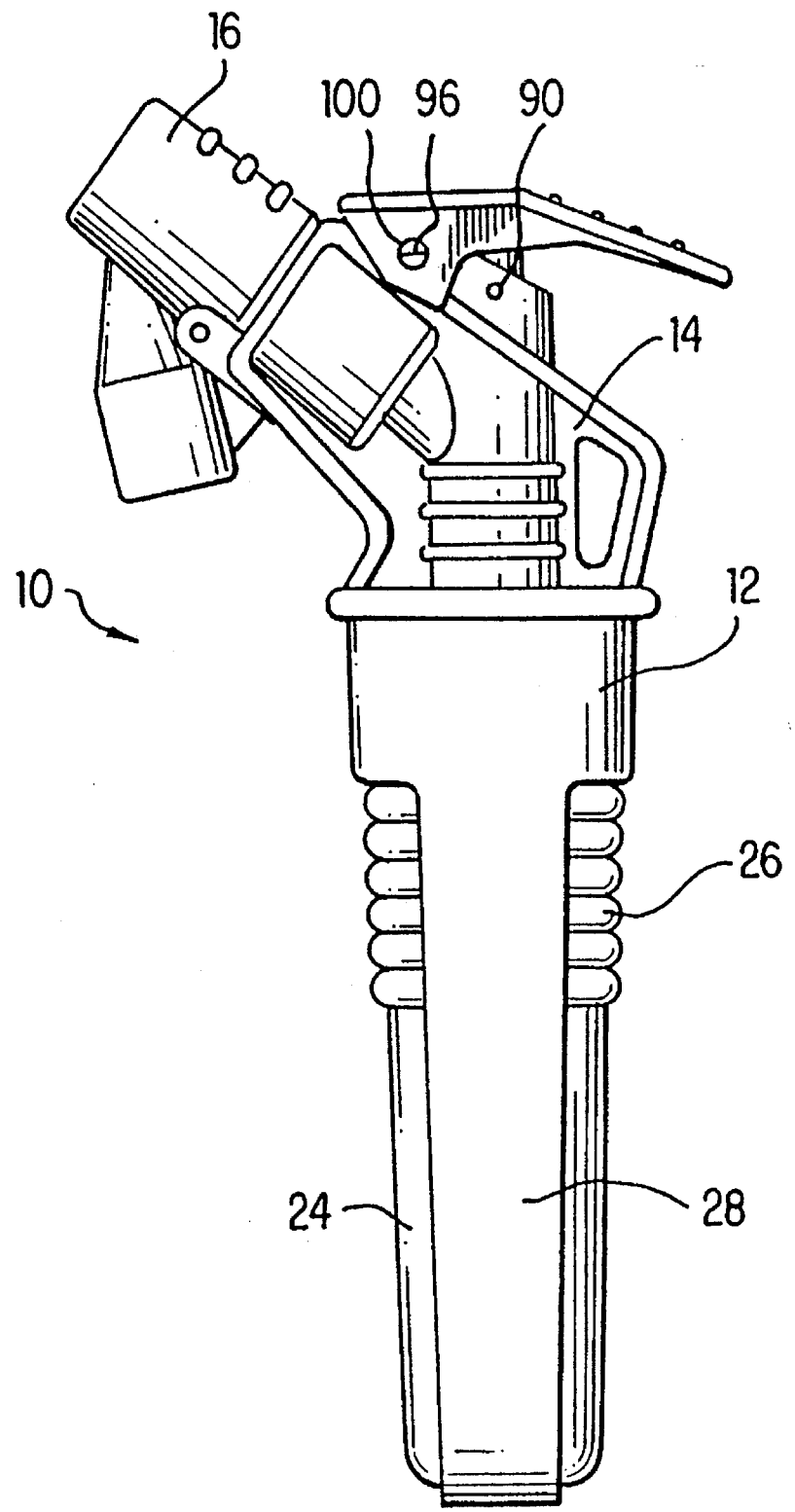
FIG. 1 is a side elevational view of the inflation device of the present invention.

Reference will be made in detail below to the preferred embodiment of the present invention as illustrated in the accompanying drawings. Throughout the following description, similar or identical structure is identified using identical reference numerals. Referring now to FIG. 1, the pressurized gas inflation device 10 of the present invention is shown. Although the present invention is intended to be used with a pressurized cartridge consisting essentially of $CO_2$ gas, other pressurized gases may be used. The inflation device of the present invention generally a includes a housing member 12, a head unit 14 and a nozzle 16. Housing member 12 is preferably injection molded in the shape of a cylinder having an open upper end 18 and a substantially closed lower end 20 (see FIG. 2). Housing member 12 includes an interior wall 22 and an exterior wall 24 which together define a thickness of approximately 3.0 mm. Provided on exterior wall 24 of housing member 12 are several ribs 26 which assist the user in gripping the housing member of the device. Although six ribs are illustrated, any number of ribs may be provided on exterior wall 24. Also provided on exterior wall 24 are two opposingly disposed flat panels 28 (FIG. 1). Panels 28 assist the user in unscrewing housing member 12 from head unit 14. Panels 28 may also be used as a location for imprinting trademark or product information on the device. Ribs 26 and panels 28 are preferably molded together with exterior wall 24 of housing member 12 during the molding process to form a single monolithic unit.

Housing member 12 is preferably molded from a lightweight, hard plastic. In the preferred embodiment, housing member 12 is molded from a plastic containing glass filled nylon filaments. Such a plastic is manufactured by DSM Plastics, under product No. J3–30. Naturally, other materials having the afore-mentioned characteristics are equally suitable for forming housing member 12. Although housing member 12 is shown as being generally cylindrical in shape, the exterior shape of housing member 12 may take a form other than that specifically shown in the figures. For example, housing member 12 may include a smooth exterior surface and may be generally rectangular in shape.

At the upper end of housing member 12, interior wall 22 is threaded (as at 30) to receive a correspondingly threaded portion 32 of head unit 14. Along the length of interior wall 22, several longitudinally extending projections 34 are provided to maintain a space between the interior wall of the housing member and the pressurized gas cartridge received therein. This space allows gas to pass down the length of the housing and out a vent 36 in the event that housing member 12 is unscrewed from head unit 14 while a charged gas cartridge is within the device.

Figure 2:
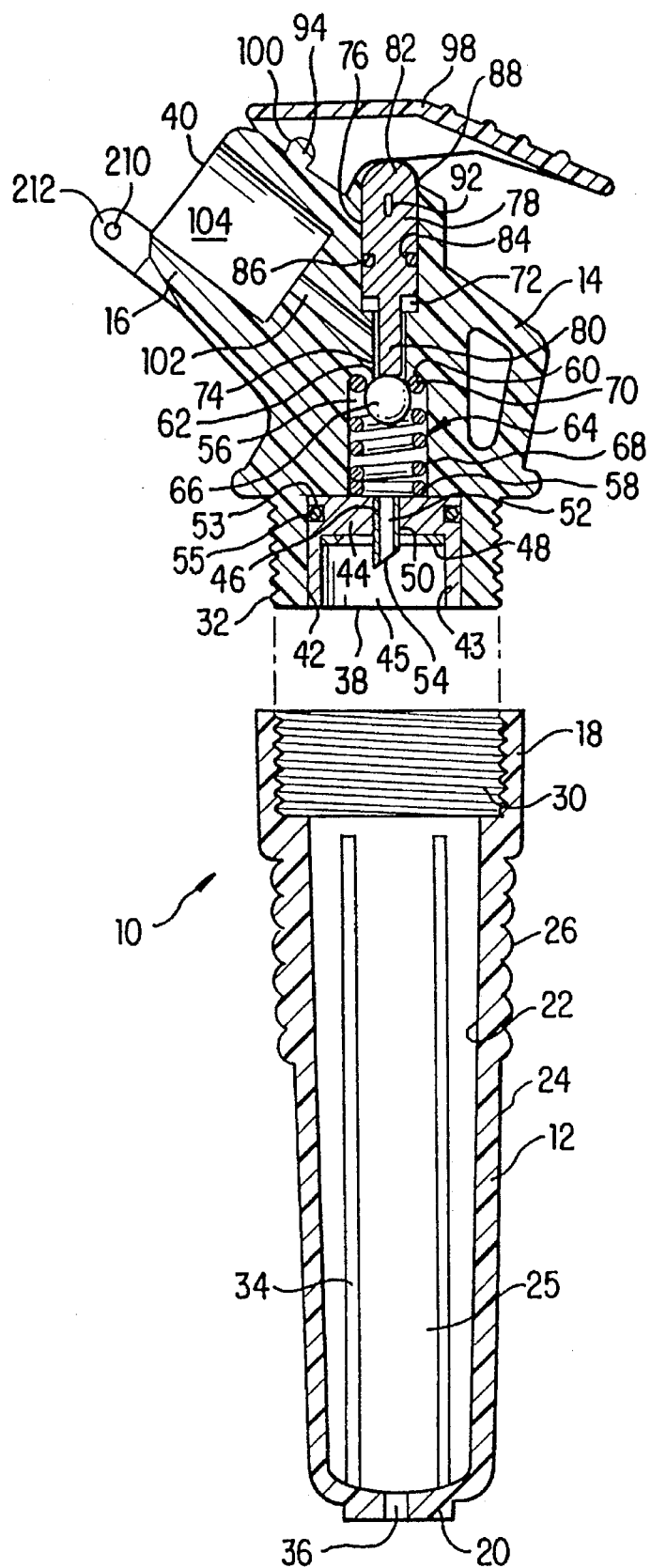
FIG. 2 is a longitudinal cross-sectional view of the housing member and head unit of the inflation device.

Threadably attached to housing member 12 is head unit 14 which is injection molded from the same plastic used to form housing member 12. With reference to FIG. 2, head unit 14 includes an inlet 38 and an outlet 40. Extending from inlet 38 is a main bore 42. Press-fit into main bore 42 is a lance supporting member 44 formed from brass. Lance supporting member 44 includes a cylindrical extension 43 which defines an interior area 45. Interior area 45 is dimensioned to receive the neck of a pressurized gas cartridge which will be discussed in more detail below. Provided at the upper end of interior area 45 is a flat seal 48. Flat seal 48 creates a seal between the neck of the cartridge and the lance supporting member when the cartridge is loaded within the device. A number 008 Buna flat seal having a Shore A durometer hardness of 90 is suitable for this purpose. Such a seal is available from Lutz Co., Elkgrove Ill. A thermal-polyurethane having the afore-mentioned hardness may also be used to form flat seal 48.

Disposed within a bore 50 of lance supporting member 42 is a hollow piercing lance 46 which punctures the seal of a pressurized gas cartridge when the same is brought into contact with the lance. Lance 46 includes a hollow lumen 52 and an obliquely-cut piercing tip 54 formed preferably from a rigid material, such as LEADLOY™, steel, or any other rigid material. Obviously, any other material capable of puncturing the seal of a pressurized gas cartridge may be used to form lance 46. Formed within the exterior wall of lance supporting member 44 is an annular groove 53 which receives a lance supporting member sealing ring 55. Sealing ring 55 creates an air-tight seal between lance supporting member 44 and main bore 42 to prevent unwanted leakage of gas.

Formed above main bore 42 is a chamber 56. Chamber 56 includes a first end 58 and a second end 60 which defines an aperture 62 of approximately 3.125 mm. Aperture 62 is provided so that gas may pass through to the remainder of head unit 14 when the device is activated as discussed below.

Figure 2A:
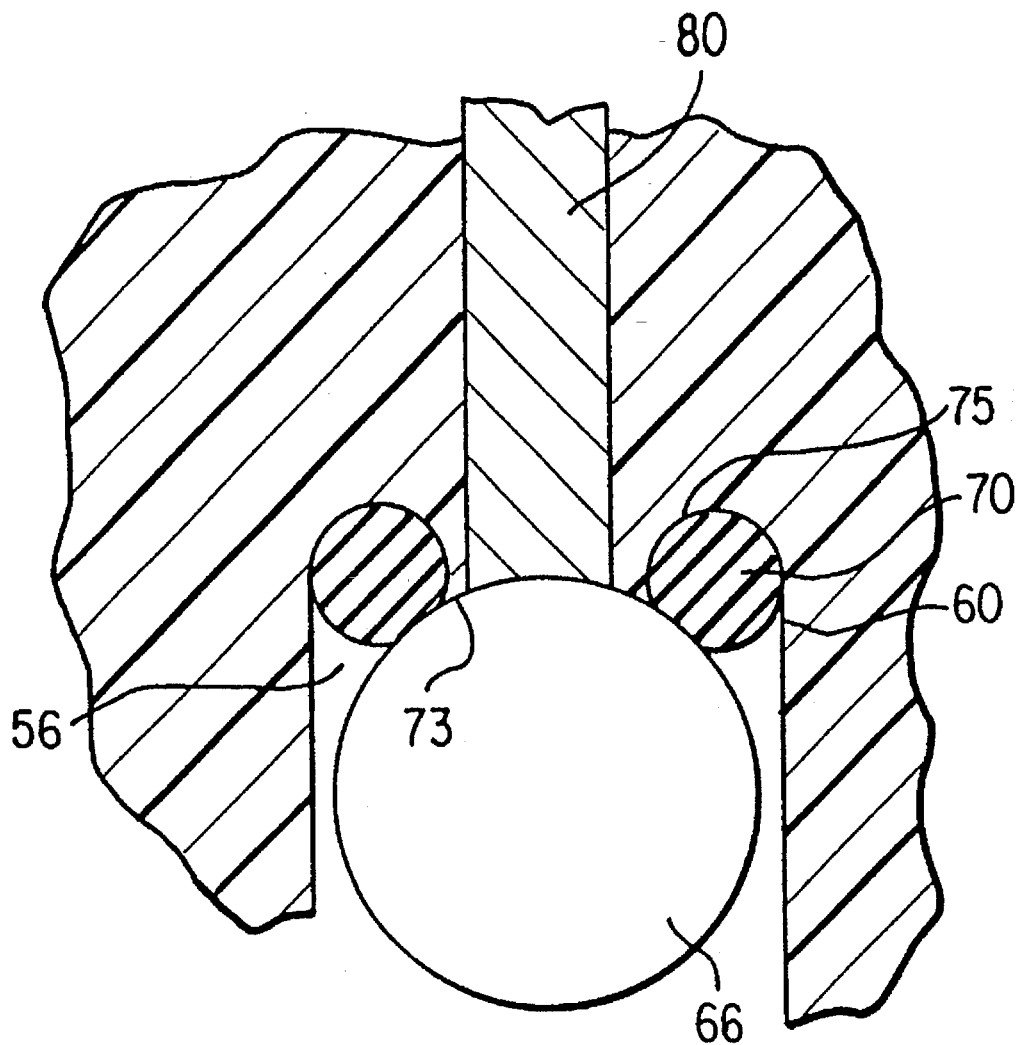
FIG. 2a is a partial, enlarged, cross-sectional view of the main valve assembly shown in FIG. 2.

Chamber 56 receives a main valve assembly 64 which controls the flow of gas passing through head unit 14. Main valve assembly 64 includes a valve ball 66, a spring 68, and a valve ball sealing ring 70. The main valve assembly is incorporated into head unit 14 (prior to inserting lance supporting member 44) in the following manner. Valve ball sealing ring 70 is inserted into chamber 56 and positioned within a groove 75 provided at second end 60 of chamber 56 (see enlarged views FIG. 2a). Following insertion of sealing ring 70, valve ball 66 is positioned beneath sealing ring 70 against a valve ball seat 73. The leading end coil of spring 68 is then positioned about the circumference of valve ball 66 and is compressed within chamber 56 by inserting lance supporting member 44 into main bore 42. When the valve assembly is properly positioned within the chamber, the valve assembly is in a closed position (i.e., spring 68 biases valve ball 66 against valve ball seat 73 to close aperture 62). As shown in FIG. 2a, valve ball seat 73 extends into chamber 56 to stop the motion of valve ball 66 during inoperative periods of use such that sealing ring 70 is only partially compressed. This partial compression of sealing ring 70 prevents permanent deformation of the ring, thereby enabling long term containment of unused gas.

Located above chamber 56 is a two-diametered channel 72 which includes a first portion 74 and a second portion 76. Channel 72 is dimensioned to receive a plunger 78 which communicates with valve ball 66 to open main valve assembly 64. First portion 74 receives stem portion 80 of plunger 78, while second portion 76 receives head portion 82. The dimensions of plunger 78 are slightly smaller than those of first and second portions 74, 76 to allow plunger 78 to move within channel 72. As plunger 78 moves down channel 72 and through aperture 62, gas is allowed to pass through the remainder of the head unit to nozzle 16. Head portion 82 is provided with a groove 84 which receives a plunger sealing ring 86 to prevent gas from leaking out of head unit 14 through opening 88. Plunger 78 is inserted into channel 72 through opening 88 until stem portion 80 abuts against valve ball 66. The plunger is retained within the channel by a pin 90 (see FIG. 1) inserted through the upper portion of head unit 14 and into an elongated slot 92 provided in head portion 82.

Molded across the top of head unit 14 is a pivot bar 94 having opposingly disposed extensions 96 (FIG. 1) on the ends thereof. A lever 98 is hingedly attached to pivot bar 94 by placing extensions 96 into holes 100. When lever 98 is properly attached to pivot bar 94, the bottom surface of the lever comes into contact with the rounded head portion of the plunger. Thus, lever 98 functions to activate the inflation device of the present invention by depressing plunger 78 to open main valve assembly 64.

Branching off from channel 72 is a conduit 102 which feeds into a nozzle receiving cavity 104. FIG. 3 illustrates nozzle 16 of the present invention. Nozzle 16 includes a casing 106 having an exterior surface 108 and an interior surface 110. The interior surface of casing 106 defines a central conduit 112 which extends from an inlet 114 to an outlet 116. In the mid-portion of conduit 112, interior surface 110 is provided with six equiangularly spaced grooves 113 which allow gas to pass around an internal component of the nozzle to be discussed in more detail below. Although the preferred embodiment of the invention is provided with six grooves, any number of grooves which facilitate the flow of gas through the nozzle may be provided. At outlet 116, casing 106 is angled at approximately 12°–15° to engage in a fluid-tight manner with an adaptor of an inflation valve to be discussed in more detail below. The casing of nozzle 16 is preferably injection molded from the same plastic used to form housing member 12 and head unit 14.

Disposed within central conduit 112 is a safety pin 118, a flow restricting means 120, and a heat sink 122 for revaporizing any dry ice which may be formed as the phase of the gas changes. Components 118, 120, and 122 of nozzle 16 will now be described in their order of assembly into nozzle 16.

Figure 4:
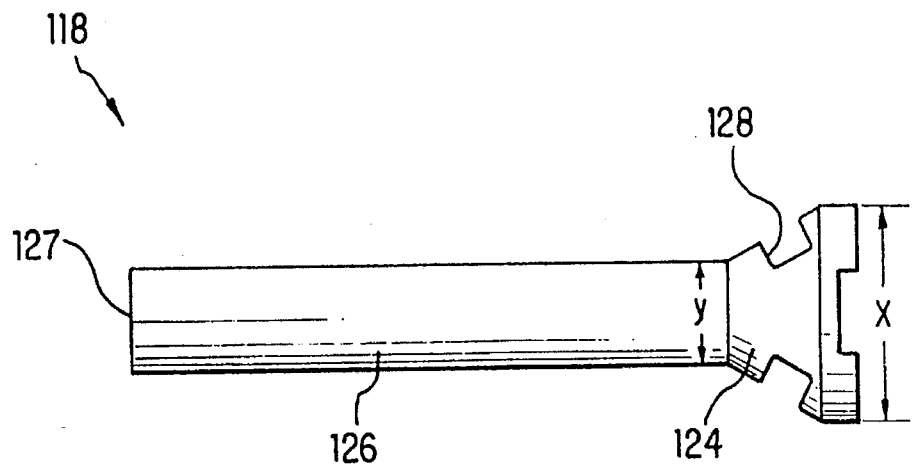
FIG. 4 is a side elevational view of the safety pin of the nozzle of the inflation device.

Safety pin 118 is provided to prevent the release of gas from the device when the lever is depressed but the nozzle is not connected to an inflation valve of an inflatable article of manufacture. With reference now to FIGS. 3 and 4, safety pin 118 includes a crown 124, a shaft 126, and a valve engaging tip 127. Safety pin 118 is aluminum or any other non-deformable material which is capable of being machined to a particular specification. Crown 124 generally takes the shape of a truncated cone having a first diameter X of approximately 8.0 mm and a second diameter Y of approximately 4.0 mm (see FIG. 4). Provided on the exterior surface of crown 124 is a groove 128 which receives a sealing ring 130 for sealing off the forward portion of the nozzle when the device is not in use (see FIG. 3). Crown 124 tapers to a shaft 126 which is generally cylindrical in shape and approximately 24.0 mm long. Tip 127 of shaft 126 engages with the valve of an inflatable bladder when the nozzle of the device is fitted over a properly proportioned valve. As tip 127 contacts the valve, the resistance of the valve against the tip pushes safety pin 118 rearward within central conduit 112 to open the same.

Referring now to FIG. 3, safety pin 118 is inserted into nozzle casing 106 through inlet 114. The pin is pushed through central conduit 112 until sealing ring 130 abuts against an angled shoulder 132 formed by interior surface 110 of casing 106. The angle of shoulder 132 corresponds to that of the truncated portion of crown 124 so that when the safety pin is pushed rearward gas may pass around the crown portion of the pin.

Figure 5:
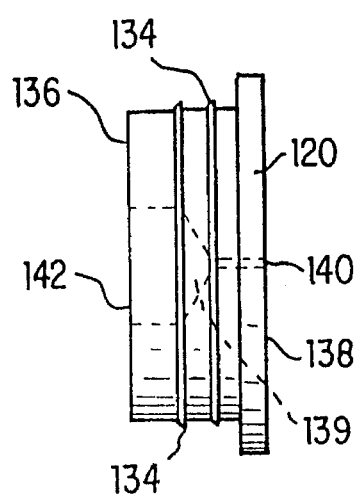
FIG. 5 is a side elevational view of a means for restricting the flow of gas through the nozzle of the inflation device.

Press fit into the inlet of nozzle 16 is a valve 120 which restricts the flow of gas passing through the nozzle. As the pressurized gas flows through restrictor valve 120, the mass flow rate of the gas is varied so that the gas exits the nozzle at a controlled and useful pressure and velocity. Restrictor valve 120 is formed from aluminum or any other rigid material capable of being machined to a particular specification. The exterior surface of restrictor valve 120 is provided with several barbs 134 (see FIGS. 3, 3a and 5) which grip the interior surface of nozzle 16 to maintain the valve within central conduit 112. Restrictor valve 120 includes a forward end 136 and a rearward end 138. Formed within the valve is a passageway 139 having a diameter which expands from an entrance opening 140 formed in rearward end 138 to an exit opening 142 formed in forward end 136. The diameter of entrance opening 140 is approximately 0.27 mm, while the diameter of the exit opening is approximately 3.5 mm.

As the gas from the pressurized cartridge approaches restrictor valve 120, it is flowing under a pressure of approximately 600 psi. The entrance opening of restrictor valve 120 restricts the number of $CO_2$ molecules which may flow into passageway 139 so that the mass flow rate of the gas is altered to a controlled and useful rate of 40 standard cubic feet per hour. Upon exiting the restrictor valve, the gas flows forward at a controlled pressure and velocity where it contacts a depression 144 formed in the crown of safety pin 118. The pressure exerted against depression 144 forces safety pin 118 forward, thereby sealing off the forward portion of central conduit 112 to prevent unwanted leakage of gas when the device is not attached to the valve of an inflatable bladder.

With continuing reference to FIG. 3, press-fit into outlet 116 of nozzle 16 is a heat sink 122. Heat sink 122 functions to vaporize any solid $CO_2$ (dry ice) which may be formed as the phase of the gas passing through restrictor valve 120 changes. In the preferred embodiment, heat sink 122 is a brass plug. The brass plug is generally tubular in shape and includes a central lumen 146 having a diameter which is slightly larger than diameter Y of safety pin shaft 126. The outer diameter of the brass plug is slightly smaller than that of central conduit 112 so that brass plug 122 may be snugly fitted within central conduit 112. The exterior surface of brass plug 122 is provided with several barbs 148 which serve to grip and maintain the plug within central conduit 112 of nozzle 16. At the end proximate tip 127, brass plug 122 curves upwardly around shaft 126 to form a lip 154 about the tip of safety pin 118 to provide an unobstructed flow path for the gas exiting central conduit 112.

When component parts 118, 120 and 122 are properly inserted within central conduit 112, a small passageway from inlet 114 to outlet 116 is created. This passageway extends through valve 120, around crown 124 and through the small space created between brass plug 122 and shaft 126.

Branching off from central conduit 112 is a secondary conduit 156 having an inlet 157 and an outlet 159. Contained within secondary conduit 156 is a means 155 for relieving any build-up of excess pressure within the mechanism. The pressure relieving means of the present invention generally includes a poppet 158, a poppet sealing ring 160, a spring 162, and a blow-off plug 164.

Figure 6:
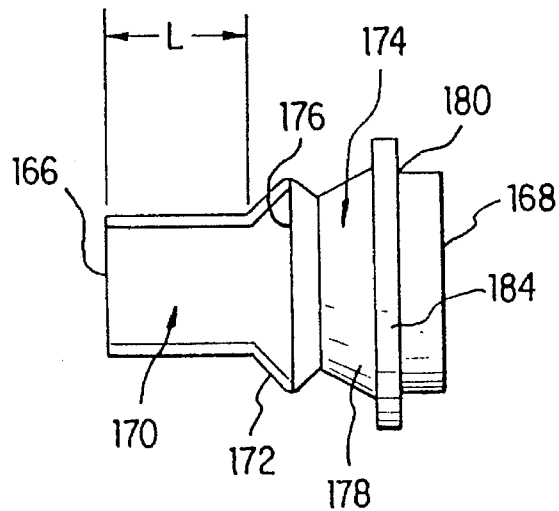
FIG. 6 is a side elevational view of the poppet of the pressure relieving means of the inflation device.
Figure 7:
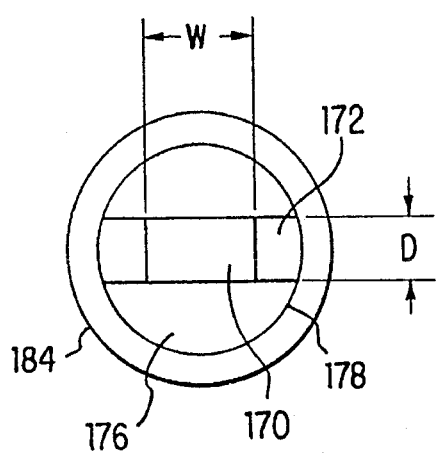
FIG. 7 is top plan view thereof.

With reference now to FIGS. 3, 6 and 7, poppet 158 includes an anterior end 166 and a posterior end 168. At anterior end 166, poppet 158 is provided with a flattened stem portion 170 having a width W of approximately 2.0 mm, a depth D of approximately 2.0 mm, and a length L of approximately 5.0 mm. Stem portion 170 flairs at 172 to converge with a head portion 174 of poppet 158. Head portion 174 is generally circular in plan and includes a planar surface 176 which is perpendicular to stem 170. Head portion 174 also includes a groove 178, a flange 184, and a spring seat 180. Groove 178 is structured to receive a poppet sealing ring 160 (see FIG. 3) which seals off the pressure relieving means when the same has not been activated by a build-up of excess pressure. Spring seat 180, formed at the juncture of flange 184 and posterior end 168, is dimensioned to receive an end coil of spring 162.

Poppet 158 is positioned within secondary conduit 156 by inserting the anterior end of the poppet through outlet 159. Mid-portion 161 of secondary conduit 156 is specifically dimensioned to snugly receive the anterior portion of stem 170. Stem 170 extends into mid-portion 161 of secondary conduit 156 until poppet sealing ring 160 engages with angled interior portion 186. When poppet 158 has been properly positioned, spring 162 is inserted into secondary conduit 156 through outlet 159. Spring seat 180 of head portion 174 receives the end coil of spring 162 to maintain the spring beneath poppet 158.

Figure 8:
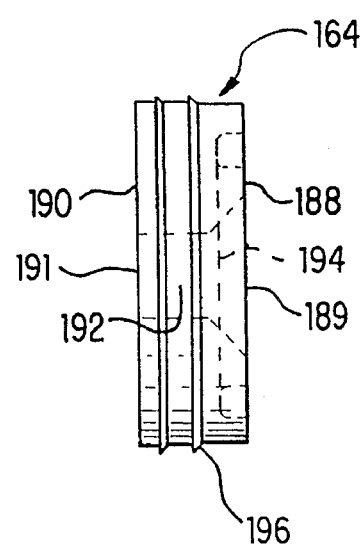
FIG. 8 is a side elevational view of the blow-off plug of the pressure relieving means of the inflation device.

A blow-off plug 164 (FIGS. 3 and 8) is inserted into outlet 159 of secondary conduit 156 to complete assembly of the pressure relieving means. Blow-off plug 164 is generally disc-shaped and includes a first end 188 and a second end 190. First end 188 defines a first aperture 189, while second end 190 defines a second aperture 191. Extending between first aperture 189 and second aperture 191 is a passageway 192 which is generally funnel-shaped for ease of production. The diameter of passageway 192 at first opening 189 is approximately 2.0 mm, while the diameter of passageway 192 at second end 191 is approximately 3.0 mm. Provided within first end 188 is a depression 194 which receives the opposite end coil of spring 162 to maintain the spring in a proper position. On the exterior surface of blow-off plug 164, several barbs 196 are provided to maintain blow-off plug 164 within secondary conduit 156. Blow-off plug 164 is press-fit into outlet 159 of secondary conduit 156 so that the opposite end coil of spring 162 fits within depression 194. When blow-off plug 164 is properly inserted within secondary conduit 156, spring 162 is compressed to bias poppet 158 against angled interior portion 186 to seal or close off the pressure relieving means from central conduit 112.

Figure 9:
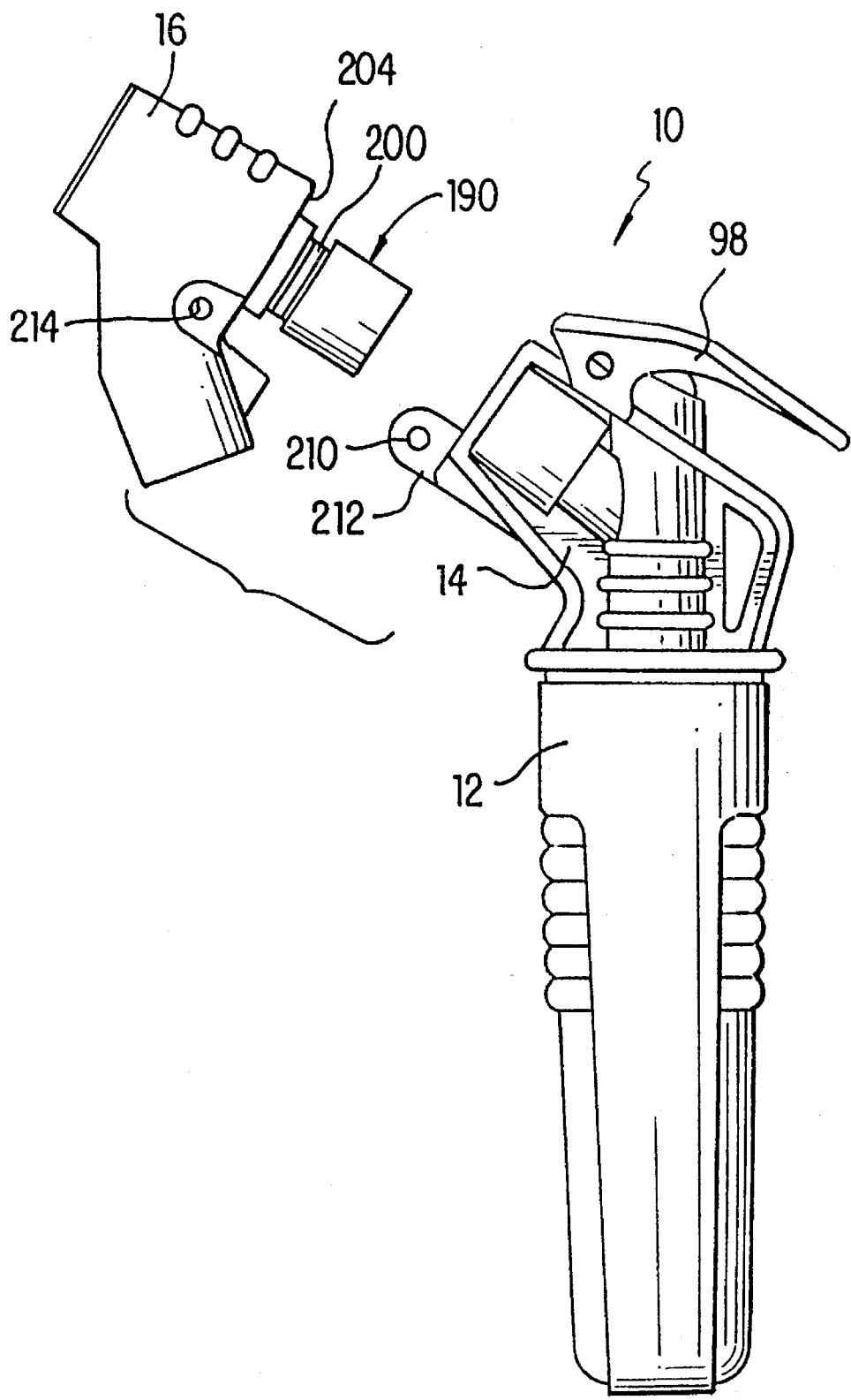
FIG. 9 is an exploded, side elevational view of the inflation device.
Figure 10:
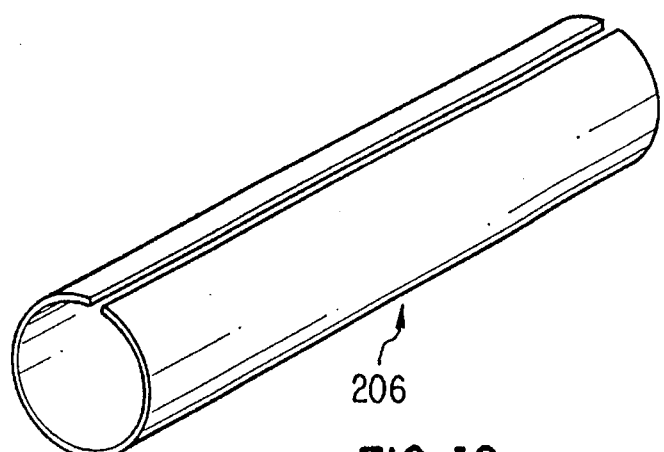
FIG. 10 is a side elevational view of the retaining pin of the inflation device.

The assembled nozzle, including safety pin 118, restrictor valve 120, and pressure relieving means 155, is then attached to the remainder of inflation device 10. With reference now to FIG. 9, rear portion 198 of nozzle 16 is provided with a groove 200. Groove 200 is dimensioned to receive a main nozzle sealing ring 202 (see FIG. 3). Sealing ring 202 prevents gas from leaking out around the exterior of casing 106 when the nozzle is inserted into the outlet of head unit 14. Rear portion 198 is inserted into nozzle-receiving cavity 104 until the end of head unit 14 abuts against shoulder 204 of nozzle 16. At this point, a roll pin 206 (FIG. 10) is inserted into a hole 210 provided in ear 212 to connect nozzle 16 to head unit 14. Pin 206 is compressed and pushed into a channel 214 to secure the nozzle within the head unit. The roll pin pushes against the interior of channel 214 to secure the nozzle within the head unit. Following insertion of pin 206, the inflation device 10 is ready for use.

Figure 11:
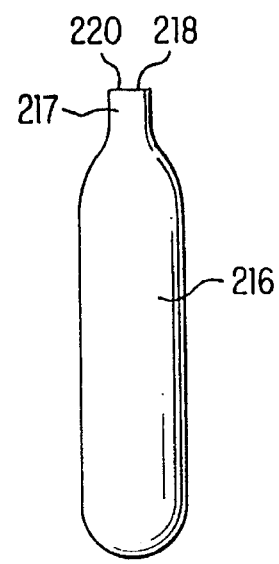
FIG. 11 is a side elevational view of a pressurized gas cartridge.

Operation of inflation device 10 will now be described. To insert a pressurized gas cartridge into the device, housing member 12 is unscrewed from head unit 14. As the user grasps the exterior of housing member 12, ribs 26 and panels 28 assist the user in applying a torque-like or rotational force against housing member 12. A cartridge 216 (FIG. 11) containing a pressurized gas is then inserted into housing member 12 by inserting the rounded end of the cartridge into the housing member. Head unit 14 is fluidly connected to housing member 12 by screwing together threaded portions 30 and 32. As head unit 14 is screwed into housing member 12, neck 217 of cartridge 216 is drawn into interior area 45 of lance supporting member 44. As the cartridge is drawn into interior area 45, obliquely-cut tip 54 of hollow piercing lance 46 punctures seal 218 of cartridge 216. The user continues to screw the head unit into the housing member until top portion 220 of cartridge 216 contacts flat seal 48. At this point, gas flows into lumen 52 of hollow piercing lance 46 and into chamber 56 of head unit 14. Flat seal 48 of lance supporting member 44 prevents gas from leaking out of the neck of the cartridge and into housing member 12. Gas within chamber 56 is prevented from entering channel 72 by main valve assembly 64 which is biased in the closed position by valve spring 68 and by the force of the pressurized gas against valve ball 66.

Figure 12:
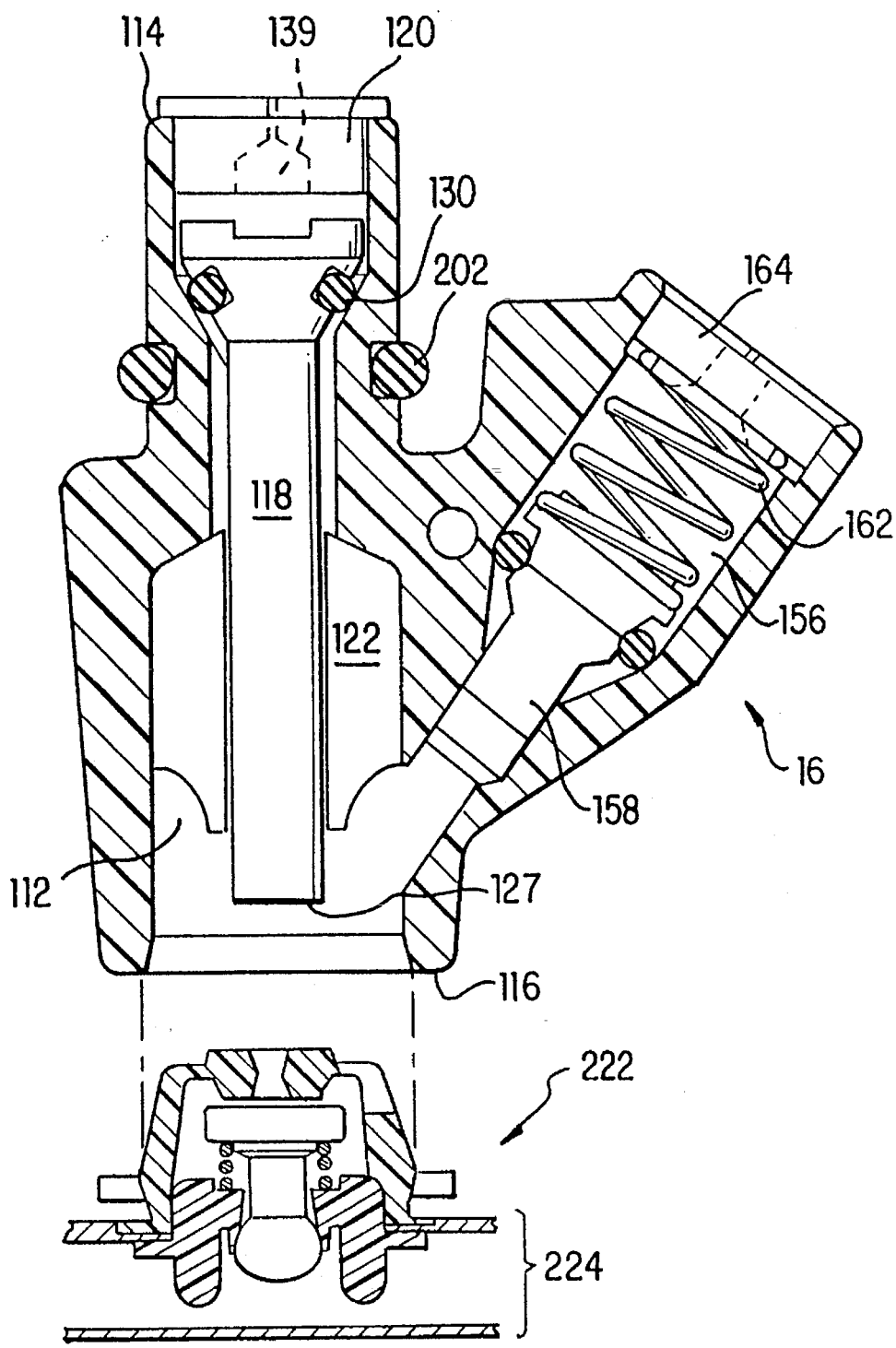
FIG. 12 is a cross-sectional view of the nozzle of the inflation device coupled to a valve of an inflatable bladder.

Use of the inflation device of the present invention will now be described. With reference now to FIG. 12, nozzle 16 is fitted onto an inflation valve 222 of an inflatable bladder 224. The angled interior wall of outlet 116 mates with inflation valve 222 to form a fluid-tight seal. As tip 127 engages with the top surface of the valve, safety pin 118 is pushed rearward to open the nozzle. To release gas from the device, lever 98 is depressed. As the lever is depressed, the undersurface of the lever comes into contact with head portion 82 of plunger 78. The force of the lever against the head portion of the plunger pushes stem 80 through aperture 62 and into contact with valve ball 66. As stem 80 passes through aperture 62 it pushes valve ball 66 into chamber 56 to open the main valve assembly. As the valve assembly opens, gas flows around valve ball 66, through channel 72 and into passageway 102. Gas is prevented from flowing around the head portion of the plunger and out of the head unit by plunger sealing ring 86.

From passageway 102, gas flows through inlet 114 of nozzle 16 and into passageway 139 of restrictor valve 120 through entrance opening 140. As the gas enters passageway 139, restrictor valve 120 alters the mass flow rate of the gas to a controlled rate of 40 standard cubic feet per hour. Upon exiting restrictor valve 120, the flow path of the gas is unrestricted to allow the gas to pass through the nozzle and expand into the bladder. At this stage, the pressure of the gas has decreased to a controlled and useful pressure of approximately 60 psi. As the gas flows around safety pin 118 and through outlet 116, it passes into inflation valve 222 of bladder 224 to inflate the same. The user continues to depress the lever until the bladder is inflated to the desired pressure. It should be noted that the components of the nozzle downstream of the restrictor valve are capable of handling flow rates which are greater than that of restrictor valve 120 to prevent a build-up of pressure in the nozzle of the device.

To halt the flow of gas, the user relieves the force applied to lever 98. As the pressure applied to lever 98 is relieved, spring 68 forces valve ball 66 against valve ball seat 73 to close the main valve assembly and seal off chamber 56. As valve ball 66 returns to seat 73, it pushes stem 80 of plunger 78 back up through aperture 62 to return the plunger to its pre-depressed condition. Nozzle 16 is then removed from the inflation valve of the bladder.

If the inflatable bladder is inflated to a threshold pressure which is capable of causing damage to the bladder, the pressure relieving means of the invention is automatically activated. Pressure relieving means 155 operates in the following manner. As the pressure of the gas within the bladder exceeds the pre-determined threshold pressure (for athletic shoe bladders, the threshold pressure has been calibrated to 17.5 psi), the inflating gas is forced back into nozzle 16. As the pressurized gas builds within the nozzle, the gas flows to an area of decreased pressure by passing into secondary conduit 156. As the excess gas travels down the length of secondary conduit 156, it flows around flattened stem portion 170 of poppet 158 to planar surface 176 of head portion 174. Planar surface 176 of poppet 156 is normally biased against angled interior portion 186 of secondary conduit 156 by spring 162. However, as the pressure in the bladder exceeds the threshold pressure, the excess pressure overcomes the force of spring 162 to push poppet 158 towards outlet 159 to open the pressure relieving means. As pressure relieving means 155 opens, gas flows around poppet 158 and through blow-off plug 164. As the excess gas exits the secondary conduit through outlet 159, an audible "hissing" sound is created which will signal to the user that the bladder is filled to capacity. In an alternative embodiment of the invention, a noise-making device (such as a reed) may be incorporated into the pressure relieving means to create a more distinctive sound which would indicate to the user that the bladder has been filled to capacity. As the pressure against planar surface 176 is relieved (e.g., by halting the flow of gas), the compressed coils of spring 162 force head portion 174 of poppet 158 against angled interior surface 186 to close and seal pressure relieving means 155.

In an alternate embodiment, the blow-off valve of the invention may be made adjustable so that the pressure relieving means may be calibrated to open at numerous threshold pressures. Such adjustability may be accomplished by providing blow-off plug 164 with a thread for altering the resistance of spring 162 against poppet 158.

Thus, the pressurized inflation device of the present invention rapidly and efficiently inflates an inflatable article of manufacture. In addition, the inflation device of the present invention is capable of storing unused quantities of gas for future use and is easily and inexpensively mass manufacturable.

Figure 13:
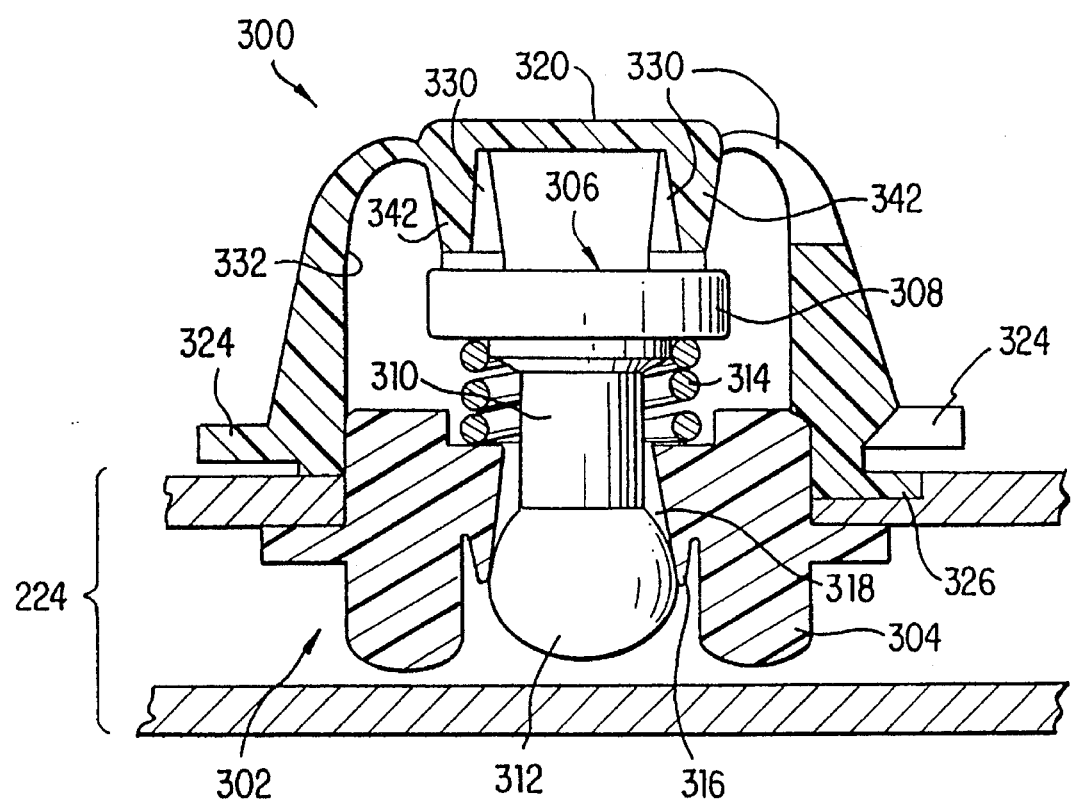
FIG. 13 is a cross-sectional view of the valve and adaptor of an inflatable bladder.

It should be noted by those skilled in the art that the outlet of the nozzle may be dimensioned or structured to engage with an inflation valve of any configuration. An inflation valve having a very specific configuration is illustrated as 302 in FIG. 13. Inflation valve 302 controls the amount of gas flowing into and out of bladder 224. Thus, inflation valve 302 may also be used to vent fluid from bladder 224. Inflation valve 302 includes a housing 304 and a fitting 306 which is moveable between an open position and a closed position to control the flow of gas entering and exiting a main passageway 318. Housing 304 is preferably molded from a thermal-polyurethane so that it may be easily attached (by rf welding, for example) to inflatable bladder 224. Fitting 306 includes a plunger 308 having a stem portion 310 and a stop member 312. A coil spring 314 is disposed about the stem portion of plunger 308 to bias fitting 306 in the shown closed position. As shown in FIG. 13, when plunger 308 is in the closed position, stop member 312 abuts against an annular shoulder 316 to prevent gas from leaking out of the bladder. The components of fitting 308 may be made out of a number of materials including hard plastics or lightweight metals (such as aluminum).

Securingly received about inflation valve 302 is an adaptor or cover 300. In one aspect of the invention, adaptor 300 may be coupled with nozzle 16 of pressurized gas inflation device 10 to inflate bladder 224. In another aspect, adaptor 300 functions as a cover to prevent dirt and other particulate matter from entering inflation valve 302. Although adaptor 300 prevents dirt from entering the interior of valve 302, it does not prevent gas from exiting the valve during deflation of the bladder.

Figure 14:
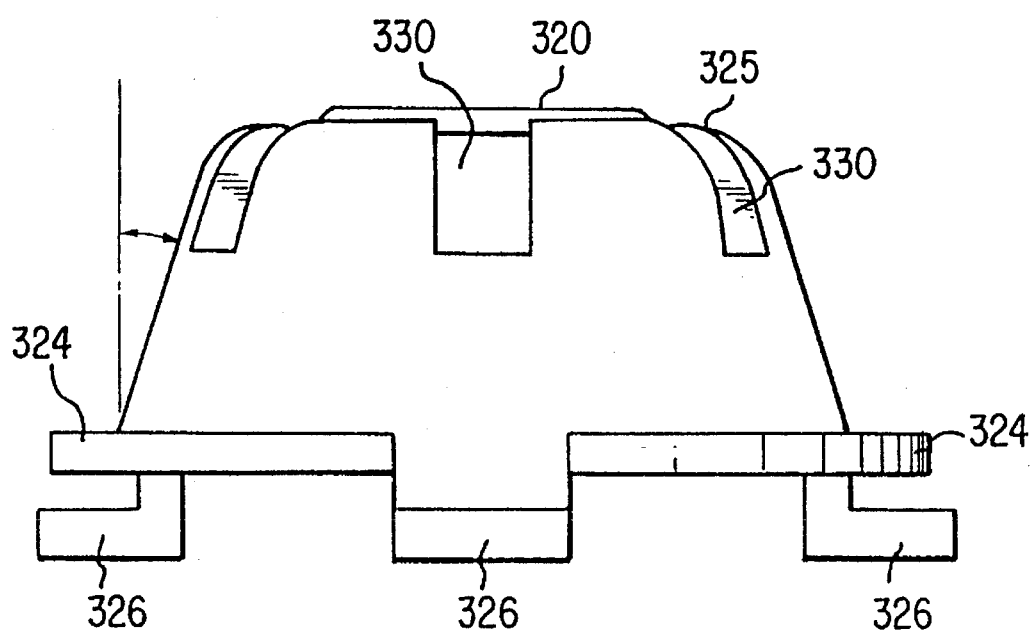
FIG. 14 is a side elevational view of the adaptor of the present invention.

Adaptor 300 is preferably formed from a moldable, elastic material having a thickness of approximately 1.0 mm. ESTANE™, available from B.F. Goodrich, and PELLETHANE™, available from Dow Chemical Corporation are suitable products for forming adaptor 300. As shown in FIGS. 13 and 14, adaptor 300 includes a top surface 320, a cylindrical side wall 322, extensions 324, and attachment tabs 326. Top surface 320 has a diameter of approximately 9.69 mm and includes a 5.0 mm boss standing 0.5 mm high from top surface 320. Side wall 322, standing approximately 5.0 mm high, is slightly angled at approximately 18° to engage in a fluid-tight manner with the angled outlet of nozzle 16. It should be realized by those skilled in the art that the dimensions of the adaptor are dictated by the outer profile of the inflation valve and the inner profile of the nozzle of an inflation device. Therefore, adaptor 302 may be dimensioned differently than that described specifically herein.

Figure 15:
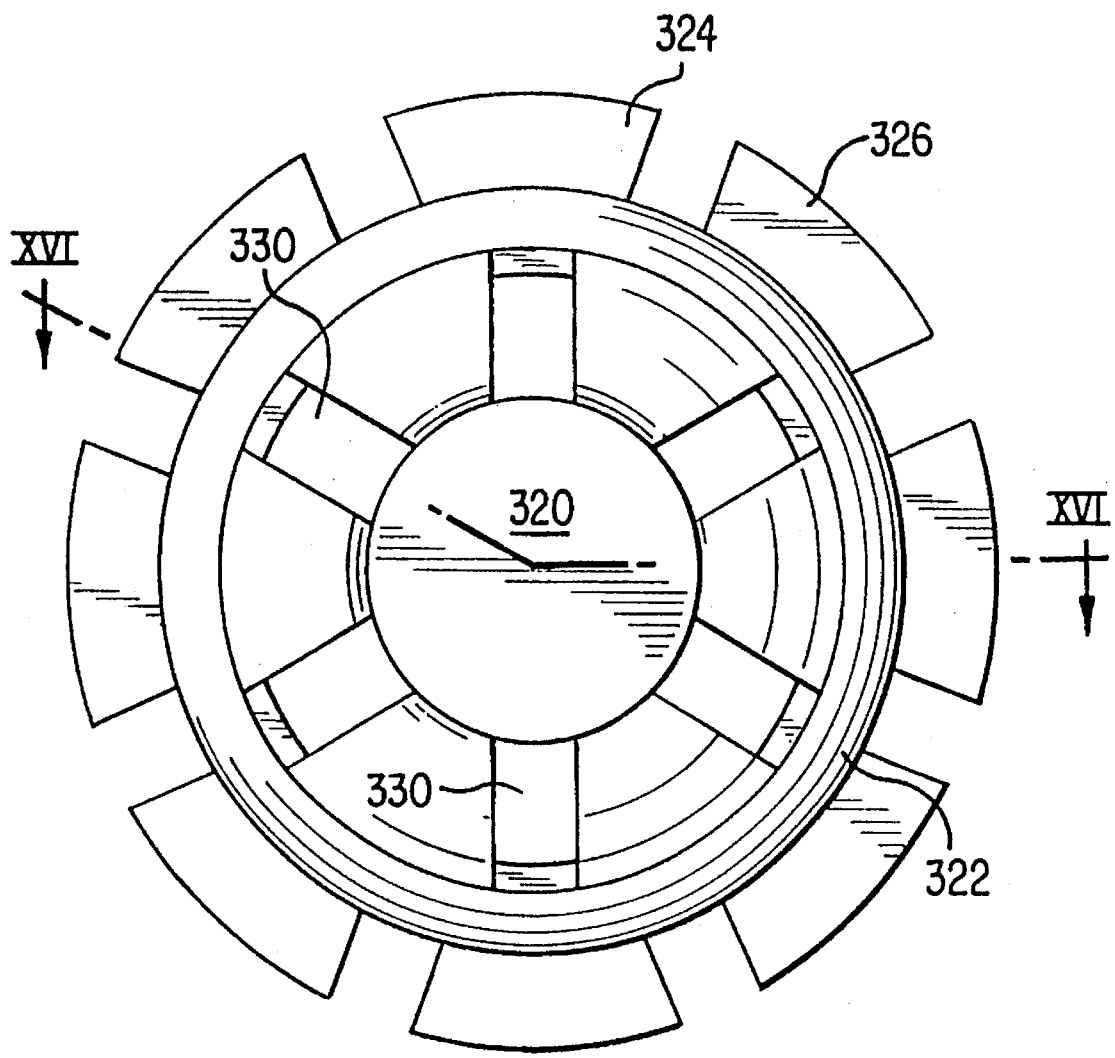
FIG. 15 is a top plan view thereof.

Top surface 320 and side wall 322 are joined at their edges to define an interior area 328 which receives inflation valve 302 of bladder 224. At edge 325, top surface 320 and side wall 322 define several apertures 330 (see FIGS. 14, 15 and 16). Apertures 330 allow gas to pass into and out of the adaptor. In the preferred embodiment, six apertures are equiangularly spaced about edge 325 of top surface 320 and side wall 322. However, any number of apertures may be provided so long as gas is allowed to pass freely into and out of the adaptor. Apertures 330 are approximately 2.4 mm long and 1.5 mm wide.

Figure 16:
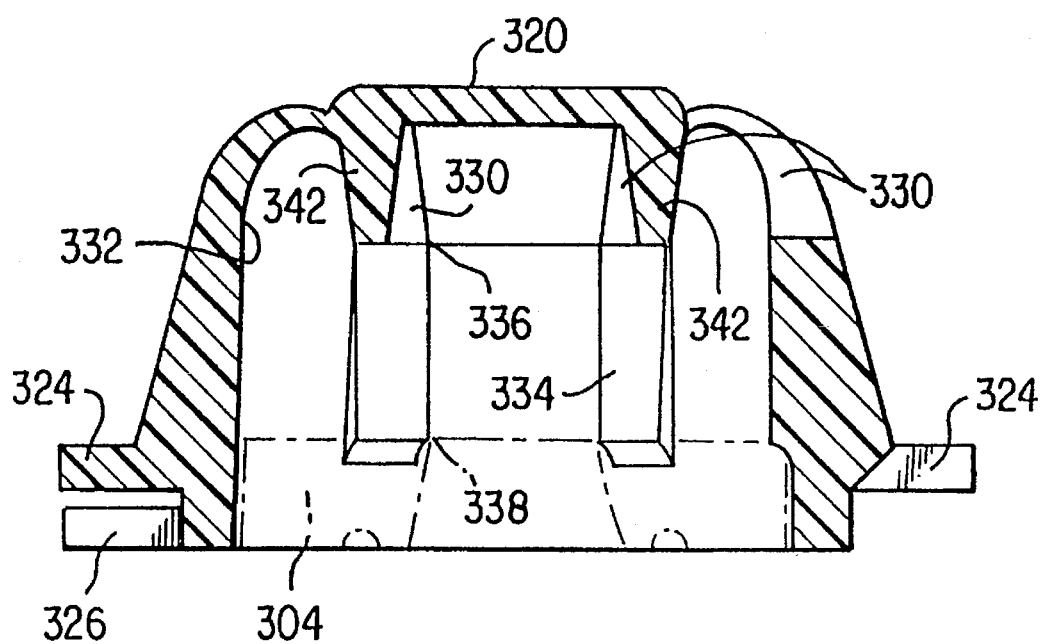
FIG. 16 is a cross-sectional view thereof taken along line XVI—XVI of FIG. 15.

With reference to FIG. 16, the internal components of adaptor 300 will now be described. Molded onto internal surface 332 of adaptor 300 are several longitudinally extending ribs 334. Ribs 334 are generally wedge-shaped, as they taper in thickness from a lower end 338 to an upper end 336. At their upper ends, ribs 334 engage with the side portion of plunger 308 to provide positive interaction with the same. At their lower ends, ribs 334 are beveled (as at 340) to sit on the upper edge of housing 304. Ribs 334 are tapered to assist side wall 322 in bowing outwardly as a pressure is applied to top surface 320 to increase the area about the stem portion of plunger 308 as the valve is opened. Ribs 334 are preferably molded directly beneath apertures 330.

Molded onto the internal surface of top surface 320 is a ring-like projection 342 which comes into contact with plunger 308 when a force is applied to the top surface of the adaptor. The projection is provided to assist in depressing plunger 306 when the user wishes to inflate or vent the bladder. Although the projection is illustrated as a ring, it should be realized that multiple projections of any shape may be provided.

With reference again to FIG. 13, the adaptor of the present invention is shown received about valve 302. Adaptor 300 is permanently affixed to bladder 224 by welding attachment tabs 326 directly to the upper film layer of bladder 224. When properly positioned about valve adaptor 302, extensions 324 lie just above of the upper film layer to allow a suitable upper material (such as leather, nylon or canvas) to be placed about the valve. The welding of adaptor 300 to bladder 224 alleviates bonding problems associated with conventional adhesion techniques. For example, certain adhesives are not compatible with the plastics used to form bladder 224 and adaptor 300.

With the adaptor now properly positioned about valve 302, the user may now inflate or deflate bladder 224. If the user wishes to inflate bladder 224, nozzle outlet 116 of inflation device 10 is brought to adaptor 300. The nozzle is positioned on adaptor 300 so that the adaptor is received in a fluid-tight manner within the outlet of the nozzle. As the angled wall of the outlet engages with the correspondingly angled wall of the adaptor, safety pin 118 presses against top surface 320. As top surface 320 is depressed, ring-like projection 342 comes into contact with plunger 306 to move stop member 312 away from annular shoulder 316. As stop member 312 moves away from shoulder 316, valve 302 opens. Simultaneously, side wall 322 bows outwardly as the top surface is depressed to increase the area about stem 310. When the nozzle has been properly positioned about the adaptor, the inflation device is activated to release pressurized gas from the device. As gas flows out of nozzle 16, it enters adaptor 300 through apertures 330. The gas then flows around stem 310 and stop member 312 into bladder 224. The bladder is inflated until the desired pressure is obtained. When the bladder is inflated to the desired pressure, the inflation device is removed from the adaptor. As the force applied by safety pin 118 is relieved, projection 342 moves away from plunger 306. Spring 314 then moves stop member 312 back into contact with shoulder 316 to close valve 302 and to seal the pressurized gas within the bladder.

If the user wishes to deflate bladder 224, a force (applied by the user's finger, for example) is applied to the top surface of the adaptor. As the top surface is depressed, projection 342 depresses plunger 306 to push stop member 312 away from shoulder 316. As valve 302 opens, gas flows out of the bladder (around stop member 312) and into the interior area of the adaptor. The gas exits the confines of the adaptor by flowing out of apertures 330. When the desired amount of gas has been vented from the bladder, the force applied to top surface 320 is relieved. Upon removal of the force, projection 342 moves away from plunger 306 and spring 314 brings stop member 312 back into contact with shoulder 316. The valve is now closed to prevent the escape of gas within the bladder.

Similar adaptor configurations which are equally suitable for use with the inflation device of the present invention are also disclosed in U.S. application Ser. Nos. 08/109,995 and 07/965,970. The specifications of these applications are incorporated herein by reference. Naturally, the nozzle and adaptor of the present invention may be structured for use with any type of inflatable article of manufacture, including tires, air cushions, support belts, sports balls, or other articles of inflatable athletic equipment.

While the present invention has been disclosed in connection with the preferred embodiment thereof, it should be understood that there are other embodiments which fall within the spirit and scope of the invention as defined by the following claims.

What is claimed is:

1. An inflation device, comprising:

a head unit, said head unit including an inlet, an outlet, and a passageway extending between said inlet and said outlet;

a source of pressurized gas in fluid communication with said inlet of said head unit;

a valve assembly for controlling the flow of gas from said source of pressurized gas to said head unit disposed within said passageway of said head unit, said valve assembly being biased in a closed position which is moveable into an open position by a depressing means positioned in contact with said valve assembly;

means for maintaining said source of pressurized gas in fluid communication with said inlet of said head unit;

a nozzle positioned in fluid communication with said outlet of said head unit, said nozzle including a first end, a second end engageable with an inflation valve of an inflatable article of manufacture, a conduit extending between said first end and said second end, means for controlling the flow rate of the gas passing to said nozzle from said head unit, said means for controlling the flow rate of the gas being positioned near said first end of said nozzle and downstream of said valve assembly, a pin movably positioned within said nozzle downstream of said flow rate controlling means for enabling the release of gas from said device when a force is applied to the end of said pin, and means for relieving a build-up of excess pressure, said pressure relieving means being positioned downstream of said pin within a channel in fluid communication with said conduit of said nozzle, said pressure relieving means including a poppet, a spring for biasing said poppet against a seat formed by a wall of said channel, and a plug, said plug defining a hole through which excess gas may pass to relieve the build-up of excess pressure.

2. The inflation device of claim 1, wherein said means for maintaining said source of pressurized gas in fluid communication with said inlet of said head unit is a molded, threaded main body portion.

3. The inflation device of claim 1, wherein said nozzle is molded from a plastic containing glass filled nylon filaments.

4. The inflation device of claim 1, wherein said means for controlling the flow rate of the gas is a valve having a first opening, a second opening, and a passageway extending therebetween.

5. The inflation device of claim 4, wherein the diameter of said first opening is less than the diameter of said second opening.

6. The inflation device of claim 1, wherein said valve assembly of said head unit is moved into an open position by a lever disposed in contact with said depressing means.

7. The inflation device of claim 1, wherein said pressurized gas comprises $CO_2$.

8. The inflation device of claim 1, wherein said channel extends from said conduit of said nozzle at an acute angle.

9. The inflation device of claim 7 further comprising a means for revaporizing solid $CO_2$ which may be formed as the phase of the gas changes.

10. The inflation device of claim 9, wherein said means for revaporizing said solid $CO_2$ is a brass plug.

11. The inflation device of claim 10, wherein said brass plug in positioned within said conduit of said nozzle.

12. An apparatus for inflating an inflatable article of manufacture, comprising:
- a cartridge containing pressurized gas;
- an inflating head having a first open end, a second open end and a valve assembly for controlling the flow of gas from said cartridge of pressurized gas to said inflating head, said valve assembly being positioned between said first open end and said second open end;
- means for maintaining said cartridge in communication with said first open end of said inflating head;
- a nozzle in fluid communication with said second open end of said inflating head for engaging an inflation valve of an inflatable article of manufacture, said nozzle comprising a means for controlling the flow rate of the gas passing to said nozzle, said means for controlling the flow rate of the gas being positioned within said nozzle; and
- means for revaporizing a solid which may be formed as the phase of the gas changes as it passes from said cartridge to said nozzle.

13. The apparatus of claim 12, wherein said means for revaporizing solid $CO_2$ is a brass plug.

14. The apparatus of claim 13, wherein said brass plug is positioned within said nozzle.

15. The apparatus of claim 12, wherein said means for controlling the flow rate of the gas passing to said nozzle comprises a passageway which expands from an entrance opening to an exit opening.

16. The apparatus of claim 12 further comprising a pin to prevent the release of gas from said apparatus when said nozzle is not properly connected to a valve of an inflatable article of manufacture.

17. The apparatus of claim 16, wherein said pin is movably positioned within said nozzle.

18. The apparatus of claim 12 further comprising a pressure relieving means.

19. The apparatus of claim 18, wherein said pressure relieving means comprises a poppet, a spring for biasing said poppet in a closed position, and a plug.

20. The apparatus of claim 19, wherein said pressure relieving means is positioned downstream of said means for controlling the flow rate of the gas.

21. A hand held inflation mechanism for inflating an inflatable article of manufacture, comprising:
- an inflating head including an outlet connectable to an inflation valve of an inflatable article of manufacture and an inlet comprising a hollow piercing means;
- a pressurized gas cartridge having a puncturable surface which engages with said hollow piercing means of said inlet;
- a casing which receives said pressurized cartridge, said casing being removably connected to said inflating head near said inlet;
- a first passageway extending between said inlet and said outlet of said inflating head, said passageway including a valve assembly positioned near said inlet for controlling the flow of gas from said cartridge to said inflating head, said valve assembly being biased in a closed position, said valve assembly being movable to an open position by a plunger mounted proximate said valve assembly;
- a pin movably positioned within said first passageway near said outlet for enabling the release of gas from said inflation mechanism when a force is applied to the end of said pin;
- a second passageway branching from said first passageway downstream of said pin, said second passageway having disposed therein means for relieving a build-up of excess pressure within said inflating head, said means for relieving a build-up of excess pressure comprising a poppet, a spring biasing said poppet in a closed position against a wall of said second passageway, and a plug; and
- means for revaporizing solid $CO_2$ which may be formed as the phase of the gas changes as it is released from said cartridge.

22. The apparatus of claim 21, wherein said revaporizing means is a brass plug positioned about said pin.

23. A hand held inflation mechanism for inflating an inflatable article of manufacture, comprising:
- an inflating head including an outlet connectable to an inflation valve of an inflatable article of manufacture and an inlet comprising a hollow piercing means;
- a pressurized gas cartridge having a puncturable surface which engages with said hollow piercing means of said inlet;
- a casing which receives said pressurized cartridge, said casing being removably connected to said inflating head near said inlet;
- a first passageway extending between said inlet and said outlet of said inflating head, said passageway including a valve assembly positioned near said inlet for controlling the flow of gas from said cartridge to said inflating head, said valve assembly being biased in a closed position, said valve assembly being movable to an open position by a plunger mounted proximate said valve assembly;
- a pin movably positioned within said first passageway near said outlet for enabling the release of gas from said inflation mechanism when a force is applied to the end of said pin;
- a second passageway branching from said first passageway downstream of said pin, said second passageway having disposed therein means for relieving a build-up of excess pressure within said inflating head; and
- means for controlling the flow rate of the gas.

24. The apparatus of claim 23, wherein said means for controlling the flow rate of the gas is positioned downstream of said valve assembly and upstream of said pin.

25. An inflation device, comprising:
- a head unit, said head unit including an inlet, an outlet, and a passageway extending between said inlet and said outlet;
- a valve assembly disposed within said passageway of said head unit, said valve assembly being biased in a closed position and moveable into an open position by a depressing means positioned in contact with said valve assembly;

a source of pressurized $CO_2$;

means for maintaining said source of pressurized $CO_2$ in fluid communication with said inlet of said head unit;

a nozzle positioned in fluid communication with said outlet of said head unit, said nozzle including a first end, a second end engageable with an inflation valve of an inflatable article of manufacture, and a conduit extending between said first end and said second end, means for controlling the flow rate of the gas passing to said nozzle from said head unit, said means for controlling the flow rate being positioned within said conduit of said nozzle between said first end and said second end, and means for relieving a build-up of excess pressure, said pressure relieving means being positioned in fluid communication with said conduit of said nozzle and including a housing, a channel defined by a wall of said housing, a poppet disposed within said channel, a spring for biasing said poppet against a seat formed by a wall of said housing, and a plug, said plug defining a hole through which excess gas may pass to relieve the build-up of excess pressure; and means for revaporizing solid $CO_2$ which may be formed as the phase of the gas changes.

26. The inflation device of claim 25, wherein said means for revaporizing solid $CO_2$ is a brass plug.

27. The inflation device of claim 21, wherein said brass plus is positioned within said conduit of said nozzle.

* * * * *

UNITED STATES PATENT AND TRADEMARK OFFICE
CERTIFICATE OF CORRECTION

PATENT NO.:   5,544,670
DATED     :   August 13, 1996
INVENTOR(S):  Phillips *et al.*

It is certified that error appears in the above-identified patent and that said Letters Patent is hereby corrected as shown below:

Column 16, line 11, delete "21" and insert --26-- therefor.

Signed and Sealed this

Seventh Day of January, 1997

Attest:

BRUCE LEHMAN

*Attesting Officer*           *Commissioner of Patents and Trademarks*